C. F. BEAUVAIS.
FRICTION DRIVING MECHANISM FOR MOTOR ROAD AND OTHER VEHICLES.
APPLICATION FILED JULY 31, 1920.

1,359,950.

Patented Nov. 23, 1920.

INVENTOR
C. F. Beauvais,
BY
C. G. Siggers.
ATTORNEY.

C. F. BEAUVAIS.
FRICTION DRIVING MECHANISM FOR MOTOR ROAD AND OTHER VEHICLES.
APPLICATION FILED JULY 31, 1920.
1,359,950.
Patented Nov. 23, 1920.
2 SHEETS—SHEET 2.
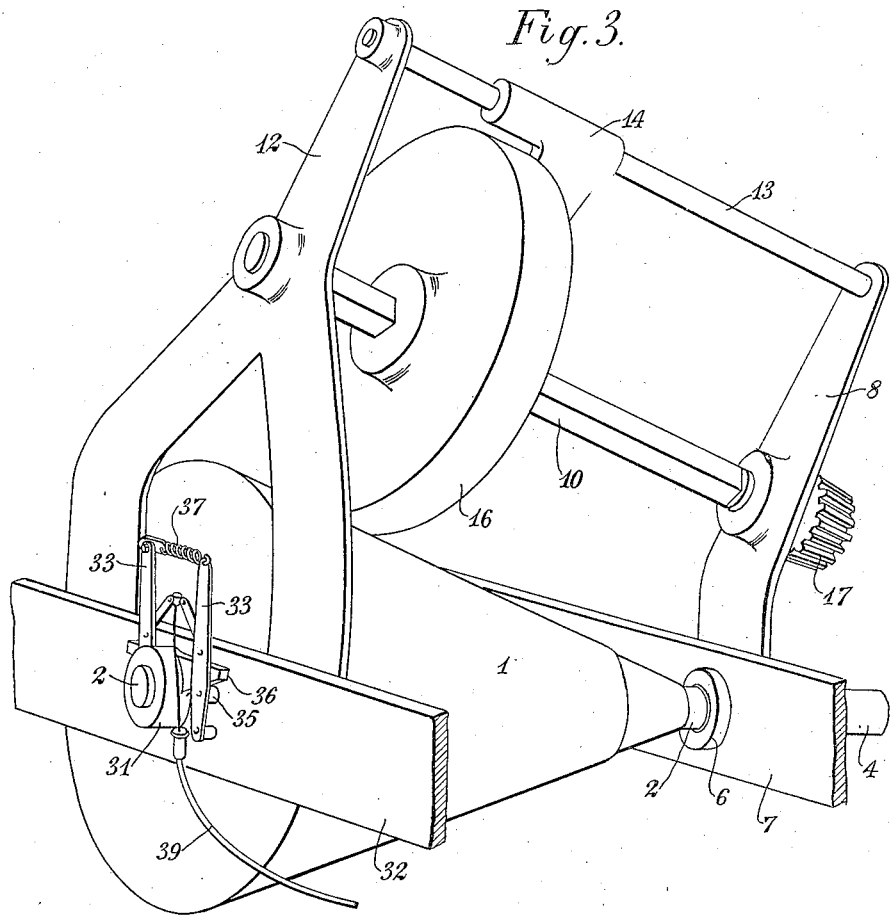
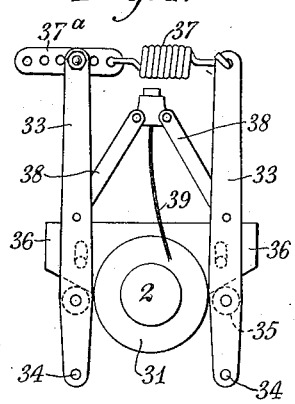
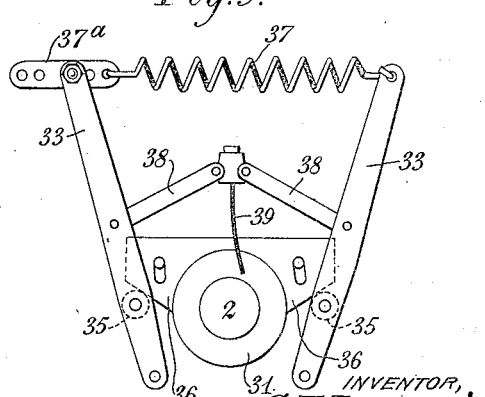
INVENTOR,
C. F. Beauvais,
BY
C. G. Siggers,
ATTORNEY.

UNITED STATES PATENT OFFICE.

CHARLES FREDERICK BEAUVAIS, OF CAMBERWELL, LONDON, ENGLAND.

FRICTION DRIVING MECHANISM FOR MOTOR ROAD AND OTHER VEHICLES.

1,359,950.  Specification of Letters Patent.  Patented Nov. 23, 1920.

Application filed July 31, 1920. Serial No. 400,479.

*To all whom it may concern:*

Be it known that I, CHARLES FREDERICK BEAUVAIS, a subject of His Majesty the King of England, and resident of Camberwell, in the county of London, Kingdom of England, have invented certain new and useful Improvements in or Relating to Friction Driving Mechanism for Motor Road and other Vehicles, of which the following is a specification.

This invention relates to improvements in friction driving mechanism particularly for use on motor road and other vehicles and to such mechanism of the type comprising a cone or the like on the main drive shaft, a driven shaft, a friction wheel or disk slidably mounted on said driven shaft, means for moving said friction wheel longitudinally of said cone, and means for conveying motion from the driven shaft to the wheels of the vehicle.

The invention has for its object to provide improved friction driving mechanism of the type in which slipping will be reduced to the minimum and in which better contact will be obtained.

The present invention is characterized in that the cone is angularly moved into contact with the friction wheel or disk.

The invention will now be described with reference to the accompanying drawings, in which:—

Fig. 3 is a perspective view;

Fig. 4 is an enlarged detail of the cone contact operating mechanism in its operative position, and Fig. 5 is a similar view to Fig. 4 showing the position of the cone operating mechanism when the cone is out of contact.

Figure 1:
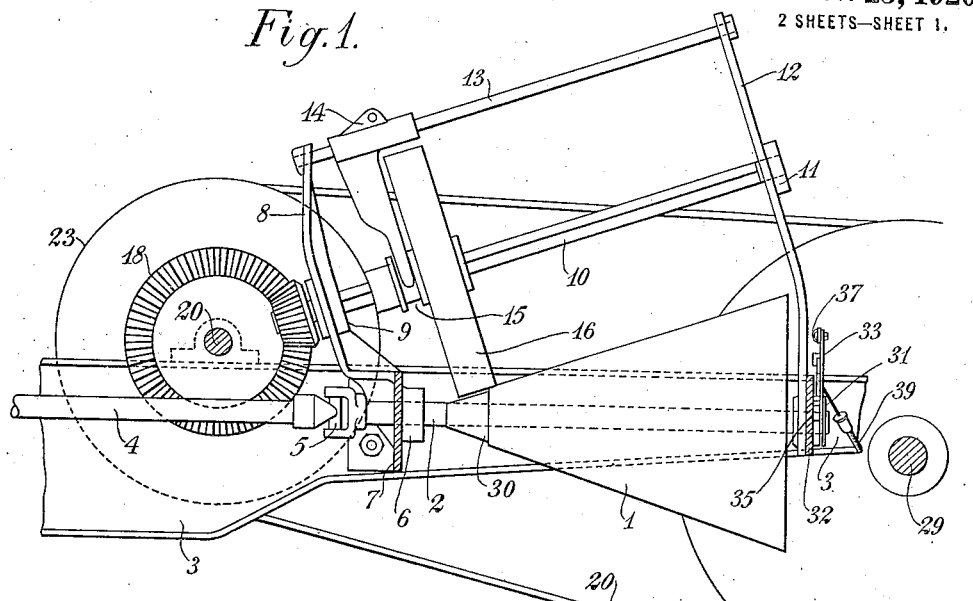
Figure 1 is a sectional side elevation of one form of the invention.
Figure 2:
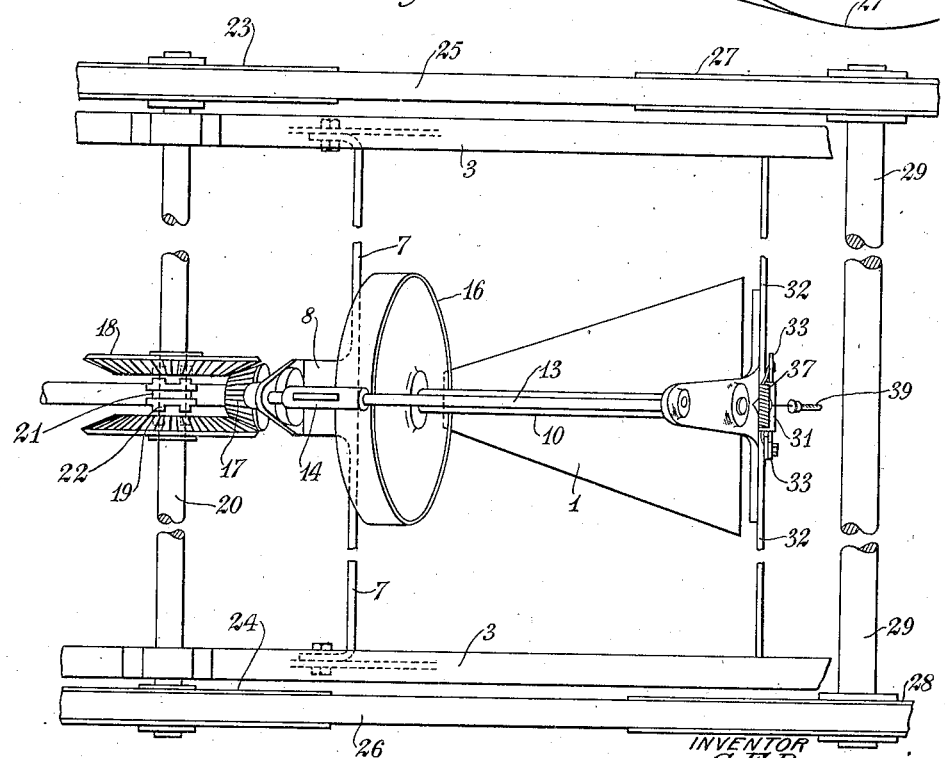
Fig. 2 is a plan thereof.

According to one form of this invention a cone 1, of metal or other suitable material, is secured to a shaft 2 which is longitudinally arranged in the chassis frame 3 of a motor car. This shaft 2 which is rotatably mounted in suitable ball bearings to be hereinafter described is connected through the medium of a shaft 4 and universal joints 5 to the engine not shown, disposed in the front of the car. The cone carrying shaft 2 is preferably mounted at its forward end in a self alining ball bearing 6 carried by a transverse member 7 which is secured at each end to the sides of the chassis frame 3. Upon this member is formed or secured a bracket 8 which is adapted to carry a ball bearing 9 in which is mounted the inner end of a squared or otherwise suitably shaped shaft 10 arranged above and parallel with the face of the cone 1. This latter shaft 10 is carried at its other end in another bearing 11 which is mounted in a frame 12 secured to the chassis 3 and to the bracket 8 by a rod or like connection 13. Upon the rod 13 is slidably mounted a member 14 which is adapted to be operated through suitable connections by a hand lever or the like arranged adjacent to the driver's seat. This member 14 is formed with a forked end and is adapted to engage with a collar 15 and move a friction wheel or disk 16 which is slidably mounted on the squared shaft 10. The periphery of the friction wheel 16 is preferably provided with fiber or rubber which is adapted to normally contact with the face of the cone 1. A bevel wheel or the like 17 is secured on the inner end of the friction wheel shaft 10 and is disposed between a pair of bevel wheels 18 and 19 preferably loosely mounted on a countershaft 20 arranged transversely across the chassis 3. This countershaft 20 is preferably formed or provided intermediate the bevel wheels 18 and 19 with a key 21 on which is slidably mounted a clutch member 22 which is adapted to be moved into or out of engagement with either of the bevel wheels 18 and 19. On the outer ends of the countershaft 20 are secured pulley wheels 23 and 24. These pulley wheels 23 and 24 are connected by chains or belts 25 and 26 to similar wheels 27 and 28 provided on the rear axle 29 and adjacent to each wheel to convey motion to the said rear axle 29 from the countershaft 20. The clutch member 22 is adapted to be moved on the countershaft 20 to lock either one or the other of the oppositely disposed bevel wheels 18 or 19 to the countershaft 20 to enable motion to be conveyed from the bevel wheel 17 on the friction wheel shaft 10, by means of an operating lever arranged adjacent to the driver's seat and suitable connections which are secured to a bell-crank lever arranged to move the said clutch member 22. Thus the countershaft 20 can be rotated in either direction according to which bevel wheel is locked thereon and the speed of the said countershaft can be varied according to the position of the friction wheel 16 in relation to the cone member 1.

The inner end of the cone member 1 is reduced in diameter, as shown at 30 in Fig. 1, so that when the friction wheel 16 is in this position it will be out of contact with the said cone member 1. The cone member 1 which is adapted to be moved into contact with the friction wheel 16 is mounted at its outer end in a self-alining ball bearing 31 which is slidably mounted in any suitable manner in a transverse carrying member 32 or in the rear portion of the chassis frame 3. This ball bearing 31 is vertically movable between a pair of levers 33 pivoted at 34 to the member 32. The levers 33 are fitted with rollers or the like 35 which are adapted to contact with the inclined faces of lugs or extensions 36 formed or provided on the ball bearing 31. The outer ends of the levers 33 are connected by a spring 37 which is preferably adapted to be adjusted through the medium of a link connection 37ª adjustably mounted on the outer end of one of the levers 33. The levers 33 are adapted to be moved apart to lower the cone member 1 out of contact with the friction wheel 16, by means of toggle links 38 which are actuated by any suitable means, such as Bowden wire mechanism indicated at 39 under the control of the driver. When the cone member 1 is in its operative or contact position the levers 33 are drawn together by the spring 37 to the position shown in Fig. 4. When it is desired to move the cone member 1 out of contact the Bowden wire mechanism is actuated to move the toggle links 38 and open the levers 33 against the action of the spring 37 and thereby allow the cone member 1 to lower out of contact with the friction wheel or disk 16. The friction wheel 16 may be moved along its shaft 10 in the manner previously described by means of a change speed lever under the control of the driver and working on a selector arm.

If desired, the sliding member 14 which is adapted to move the friction wheel 16 may be controlled from the driver's seat by a cable or Bowden wire mechanism against the action of a spiral or other suitable spring connected at one end to the said sliding member 14 and at its other end to the rear frame 12 of the device. The friction wheel 16 when out of operation would in this case be held out of contact with the wider or rear end of the cone member 1 and in a neutral position.

In a slightly modified construction the pair of bevel wheels 18 and 19 is secured on a sleeve which is slidably but non-rotatably mounted on the counter-shaft 20. In this instance the sleeve is adapted to be moved through the medium of suitable connections by the operating lever to place one or other of the bevel wheels 18 or 19 into mesh with the bevel wheel 17 on the friction wheel shaft 10.

In use there is practically no slip at the point of contact of the driven friction disk 70 and it is impossible for the parts to become overheated. The gear change is silent and the reverse can be effected at all speeds. The gyroscopic action of the revolving cone, situated at the extreme rear of the car, will have a steadying effect on the car at a high speed.

What I claim is:

1. A friction driving mechanism comprising a drive shaft, a driven shaft in angular relation thereto and adjacent to the drive shaft, a friction wheel rotatable with and slidable along the driven shaft, a cone mounted on the drive shaft to rotate therewith and normally engage the friction wheel, a bearing for the end of the drive shaft carrying the large end of the cone, and toggle mechanism, controllable from a distance and in turn controlling the end of the drive shaft carrying the large end of the cone, for moving said large end of the cone toward and from the path of travel of the friction wheel.

2. A friction driving mechanism comprising a drive shaft, a driven shaft in angular relation thereto and adjacent to the drive shaft, a friction wheel rotatable with and slidable along the driven shaft, a cone mounted on the drive shaft to rotate therewith and normally engage the friction wheel, a bearing for the end of the drive shaft carrying the large end of the cone, and toggle mechanism, controllable from a distance and in turn controlling the end of the drive shaft carrying the large end of the cone, for moving said large end of the cone toward and from the path of travel of the friction wheel, said adjusting means comprising opposed pivoted levers, a spring connecting the levers and tending to draw them together, inclined members engaged by the levers for sustaining the end of the drive shaft carrying the large end of the cone, and toggle means controllable from a distance, for spreading the levers in opposition to the spring.

3. A friction driving mechanism comprising a drive shaft, a cone fast thereon, a driven shaft angularly related to and extended lengthwise of the drive shaft, a friction wheel slidable along and rotatable with the driven shaft for engagement with the cone at different points along its surface, an adjustable bearing supporting the drive shaft adjacent to the large end of the cone, inclined members on opposite sides of the bearing, levers on opposite sides of the bearing and engaging the inclines thereon, spring means fast to the levers and having a normal tendency to draw the levers together, toggle links connected to the levers for moving them in opposition to the spring, and means controllable from a distance for causing the operation of the toggle links.

4. A friction driving mechanism comprising a drive shaft, a cone fast thereon, a driven shaft angularly related to and extended lengthwise of the drive shaft, a friction wheel slidable along and rotatable with the driven shaft for engagement with the cone at different points along its surface, an adjustable bearing supporting the drive shaft adjacent to the large end of the cone, inclined members on opposite sides of the bearing, levers on opposite sides of the bearing and engaging the inclines thereon, spring means fast to the levers and having a normal tendency to draw the levers together, toggle links connected to the levers for moving them in opposition to the spring, and means controllable from a distance for causing the operation of the toggle links, the spring having means to adjust its tension.

In testimony whereof I have hereunto signed my name.

CHARLES FREDERICK BEAUVAIS.